United States Patent [19]
Scheffer et al.

[11] Patent Number: 5,367,390
[45] Date of Patent: Nov. 22, 1994

[54] CONTRAST IMPROVEMENT FOR DISPLAY PANELS WITH MASKS BETWEEN ELECTRODES AND COVERING SPLIT BETWEEN ELECTRODE PORTIONS

[75] Inventors: Terry J. Scheffer, Portland; Kurt R. Munson, Tigard; Arlie R. Conner, Portland, all of Oreg.

[73] Assignee: In Focus Systems, Inc., Wilsonville, Oreg.

[21] Appl. No.: 126,676

[22] Filed: Sep. 24, 1993

Related U.S. Application Data

[63] Continuation of Ser. No. 757,886, Sep. 11, 1991, abandoned.

[51] Int. Cl.⁵ .................... G02F 1/1343; G02F 1/1335
[52] U.S. Cl. .......................................... 359/54; 359/67
[58] Field of Search .................................. 359/67, 54

[56] References Cited

U.S. PATENT DOCUMENTS

| | | | |
|---|---|---|---|
| 4,679,043 | 7/1987 | Morokawa | 359/53 |
| 4,824,213 | 4/1989 | Morokawa | 359/67 |
| 5,132,816 | 7/1992 | Itoh et al. | 359/67 |
| 5,138,473 | 8/1992 | Dijon et al. | 359/81 |

FOREIGN PATENT DOCUMENTS

| | | | |
|---|---|---|---|
| 0392235 | 10/1990 | European Pat. Off. | C23C 18/16 |
| 0210325 | 9/1986 | Japan | 359/67 |

OTHER PUBLICATIONS

Heinz Rieger, et al., "FLCD Showing High Contrast and High Luminance." *SID 91 Digest*, 1991, pp. 396-399.

T. Fukuchi, et al., "Self-Alignment Fabrication of ITO Electrode Pattern Electrodeposited Tricolor Filter in Black Matrix: An Application to STN-LCD." *Japan Display '89*, 1989, pp. 388-391.

*Primary Examiner*—Anita Pellman Gross
*Attorney, Agent, or Firm*—Stoel Rives Boley Jones & Grey

[57] ABSTRACT

A non-emissive flat panel display, such as an LCD having a plurality of pixels defined by the overlapping areas of row and column electrodes, is provided with a novel mask arrangement to block light from leaking through the interpixel spaces or gaps without electrically shorting the electrodes. The light-blocking mask is split into two parts, with one part deposited on each substrate to block the light from being transmitted through the inter-electrode gaps on the opposite substrate to improve the contrast ratio of the display.

10 Claims, 7 Drawing Sheets

CONTRAST IMPROVEMENT FOR DISPLAY PANELS WITH MASKS BETWEEN ELECTRODES AND COVERING SPLIT BETWEEN ELECTRODE PORTIONS

This is a continuation of application Ser. No. 07/757,886, filed Sep. 11, 1991 now abandoned.

This invention relates to non-emissive flat panel displays, such as liquid crystal display (LCD) panels, and more particularly to apparatus for improving the contrast ratio of such panels.

BACKGROUND OF THE INVENTION

Non-emissive flat panel displays, such as LCD panels, are utilized to display images of textual and pictoral information to the viewer of a computer, overhead projector, television or the like screens. Typically an LCD panel comprises a pair of spaced, opposed glass plates or substrates between which an electro-optical material, in this case liquid crystal mixture, is disposed. Overlapping patterns of transparent, spaced electrodes on the respective substrates define picture elements or pixels at the areas in which they overlap. The optical state of each pixel, i.e., whether it appears bright or dark, is determined by the application of an electrical field across each of the areas at which the electrodes overlap. In high information content LCD panels the individual pixels are "addressed," i.e., the electrical field is applied to each pixel, by a display driving system.

The display contrast ratio of a typical LCD panel is defined as the ratio of the light transmitted through an area over many pixels in the bright state divided by the light transmitted through that same area when the pixels are in the dark state. In an LCD panel having a contrast ratio of less than about 10 to 1, the displayed image appears dull or washed out. At a contrast ratio of 20 to 1 or greater, the image appears sharper and better defined.

The transmission of light through the spaces between the electrodes and, thus, between each of the pixels, results in a diminution of the contrast ratio. For example, in a standard 10-inch diagonal LCD panel with 640 column electrodes overlapping 480 row electrodes to form 307,200 pixels in which the pixel pitch is 0.33 mm and the space between the pixels is 0.03 mm, the contrast ratio is typically about 8.3 to 1.

The cell gap, i.e., the thickness of the liquid crystal layer between the substrates of an LCD panel, and its uniformity are often critical to the quality of the display. Some attempts to block transmission of light through the spaces between pixels with relatively thick materials have been ineffective because they create non-uniformities in the cell gap. Some of the best masking materials are metallic which, when provided in relatively thin layers, have effective light-blocking characteristics. Direct application of such metallic materials, however, requires the imposition of insulating materials between the mask and the electrodes in order to prevent shorting of the latter, adding to the cost and complexity of the panel.

Placing a grid of mask materials on the outside of the LCD panel would introduce severe parallax effects and would be much less effective.

SUMMARY OF THE INVENTION

This invention markedly improves the contrast ratio of non-emissive flat panel displays by providing simple and relatively inexpensive means for blocking transmission of light through the spaces between pixels. Relatively thin mask elements are applied to one of the substrates of an LCD panel corresponding to the spaces between electrodes on the opposing substrate and vice versa, so as to substantially block light transmission through the spaces surrounding the pixels.

Utilization of relatively thin metallic mask elements according to this invention eliminates the need for insulating materials between the mask elements and the electrodes.

This invention further provides an improvement in the contrast ratio of an LCD panel of the order of 3 to 4 times that of a panel absent masks between the pixels without substantially interfering with the thickness or uniformity of the cell gap of such a panel.

Special attention is given in this invention to so-called divided electrode display panels in which two sets of electrodes on one of the panel substrates are independently addressed in order to reduce the multiplex rate at which a relatively high number of pixels are addressed. According to this invention, where additional spaces occur at the split line between the two sets of electrodes, the mask elements and electrode patterns near the split line are modified and the manner of addressing them may be changed to block transmission of light through the additional spaces.

DETAILED DESCRIPTION

Figure 1:
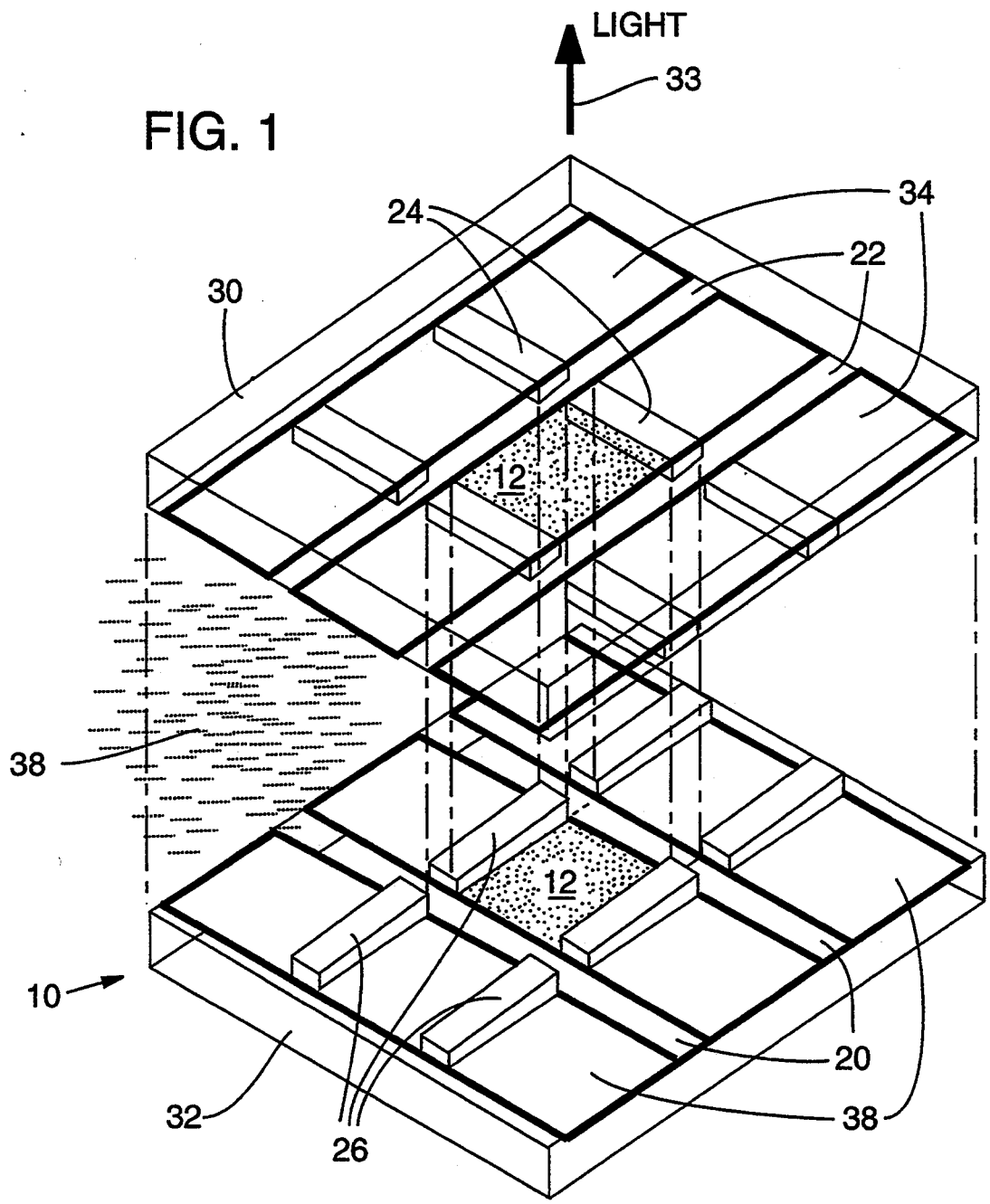
FIG. 1 is an enlarged exploded isometric view of a portion of a liquid crystal display panel embodying this invention.
Figure 2:
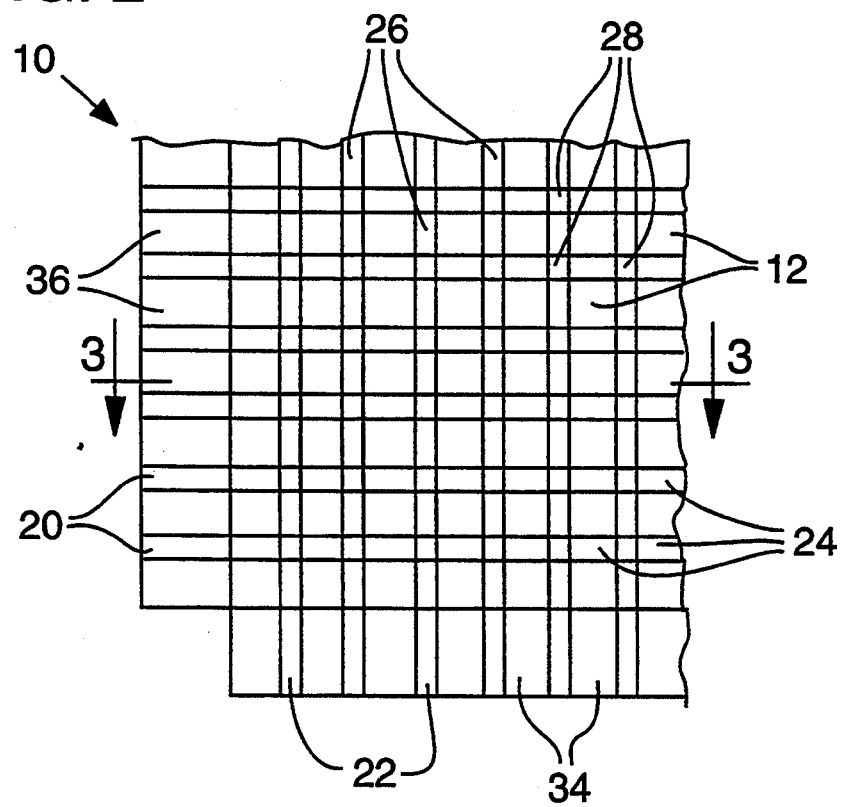
FIG. 2 is a plan view of a larger portion of the liquid crystal display panel of FIG. 1.
Figure 3:
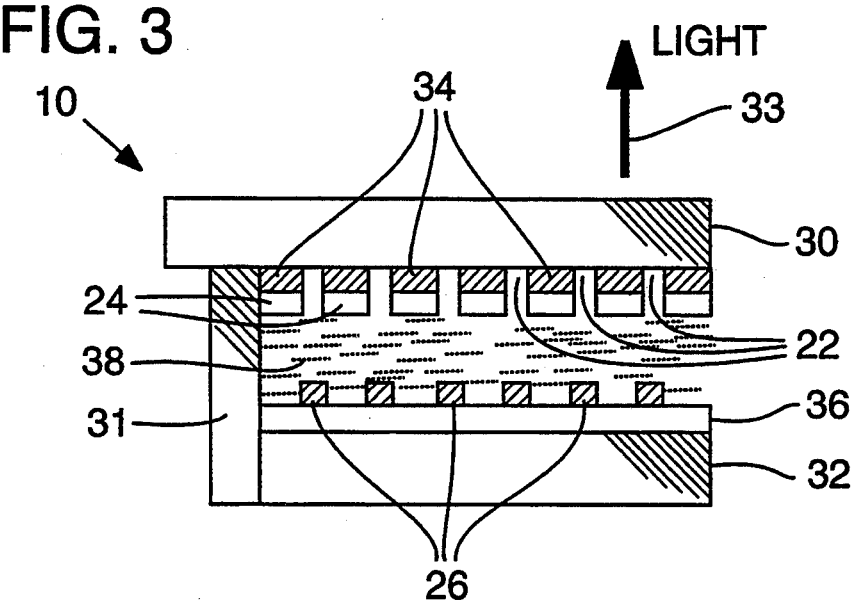
FIG. 3 is a sectional view of the liquid crystal display panel as seen from lines 3—3 of FIG. 2.

The principal embodiment of this invention includes a non-emissive flat panel display in the form of an LCD panel, generally designated 10, a portion of which is illustrated in FIGS. 1–3. Panel 10 comprises a pair of spaced, opposed substrates, such as glass plates 30, 32, between which is disposed an electro-optical material 38, such as a twisted nematic (TN), super twisted nematic (STN), ferroelectric or superhomeotropic (SH) liquid crystal material. An edge seal 31 (FIG. 3) contains liquid crystal material 38 in the space between substrates, 30, 32.

The characteristics of liquid crystal material 38 are such that it has the ability to modify the transmission of light in the direction of arrow 33 (FIGS. 1, 3) through the panel when an electric field is imposed across material 38. The light transmitted through the panel may be either from a source on the side of panel 10 opposite from the viewer (below in FIGS. 1–3) or light reflected from the same side of the panel as the viewer (above in FIGS. 1–3), as by a reflector on the opposite side.

Arrays of transparent electrodes 34, 36, commonly formed of indium-tin-oxide (ITO) respectively deposited on the inner facing surfaces of substrates, 30, 32 define the picture elements or pixels by which images are displayed on panel 10. A common pattern for the array of electrodes is an arrangement of a plurality of spaced column electrodes 34 on the inner face of substrate 30 and a plurality of spaced row electrodes 36 on the opposing surface of substrate 32 (FIGS. 1–3). The areas at which the row and column electrodes "overlap" each other (when viewed from above in FIGS. 1, 2) define pixels 12. In current forms of high information content, high resolution LCD panels, many hundreds of thousands of pixels may be defined by the row and column electrodes.

Other patterns of overlapping electrodes are also commonly utilized and may advantageously employ this invention. By the way of example, the electrodes may be arranged in a spiral pattern on one substrate and in a radial pattern on the other substrate. In this case the mask elements on the substrate with the spirally arranged electrodes would appear as a set of interrupted radial lines in order to block the light leaking through the inter-electrode gaps on the opposite substrate having the radially arranged electrodes. Similarly the mask elements on the substrate with the radially arranged electrodes would appear as a set of interrupted spiral lines in order to block the light leaking through the inter-electrode gaps on the opposite substrate having the spirally arranged electrodes.

By applying appropriate signals to the row and column electrodes the pixels may be individually "addressed", i.e., the electrical field across liquid crystal material 38 may cause each pixel either to transmit light (the "bright" state) or to block light (the "dark" state). Signals may also be applied to the electrodes to cause variations in the amount of light transmitted through each pixel between the bright and dark states, called "gray-scaling."

Images are thus created on panel 10 by the contrast in the amount of light transmitted by adjacent pixels relative to each other. The "contrast ratio" of the overall display measured over an area of many pixels is defined as the ratio of light transmitted by the bright state pixels divided by the light transmitted by the dark state pixels.

In the form of LCD panel where the light source is on the opposite side from the viewer (lower side in FIGS. 1, 3), both substrates 30, 32 are transparent as well as the electrodes 34, 36 thereon. In one form where light from the viewer's side (upper side in FIGS. 1, 3) is reflected back to the viewer, only the upper substrate 30 is transparent. In this latter form lower substrate 32 and/or electrodes 36 thereon are reflective and mask elements 24, 26 are light absorbing so as to achieve the same result of substantially blocking reflection of light from spaces 20 on substrate 32 and elements 26 block reflection of light through the spaces 22 between electrodes 34 on substrate 30.

Figure 4:
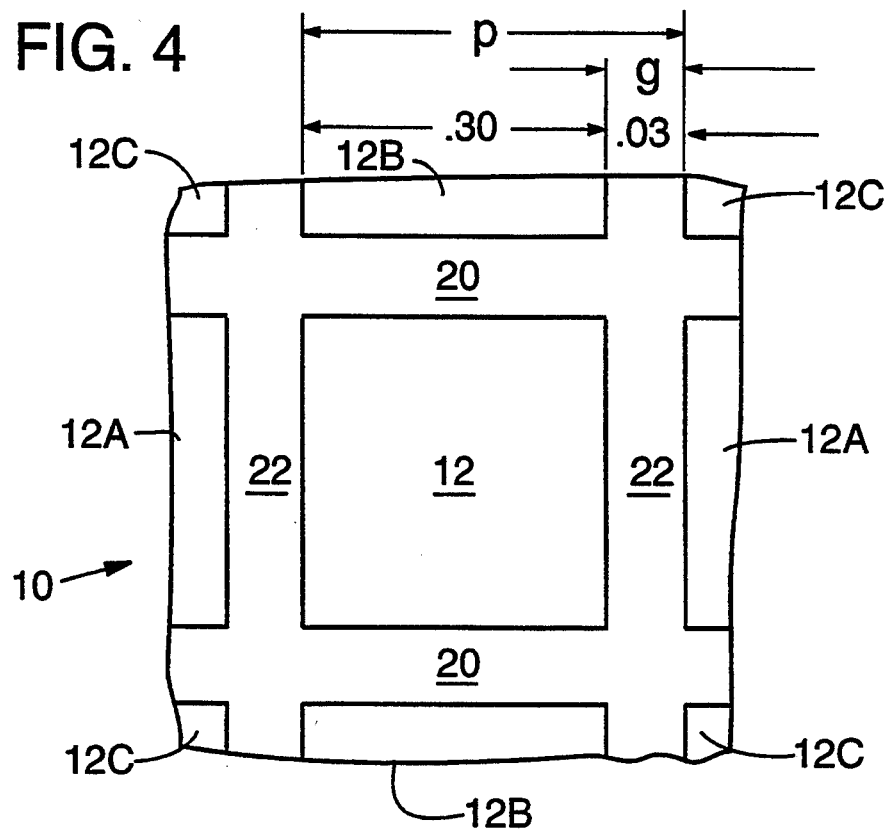
FIG. 4 is a greatly enlarged plan view of a single pixel and portions of surrounding pixels of the liquid crystal display panel of FIG. 1, absent the mask elements of this invention.

FIG. 4 is a greatly enlarged plan view of a central pixel 12 and portions of adjacent pixels, 12A, 12B, and 12C. In a conventional LCD panel wherein the pixel pitch, p, i.e., the center-to-center or edge-to-edge distance between the pixels 12 is of the order of 0.33 mm, the spaces or inter-electrode gaps, g, 20, 22 between pixels 12 and 12B and 12 and 12A, respectively, are each of the order of 0.03 mm.

When spaces or gaps 20, 22 between pixels 12 are unobstructed, (FIG. 4), transmission of light therethrough is uncontrolled. In the above example, the combined area of spaces 20, 22 is approximately 17 percent of the total display area of the panel 10. Using common assumptions, the maximum possible contrast ratio of the typical LCD panel previously described is of the order of 8 to 1.

Figure 5:
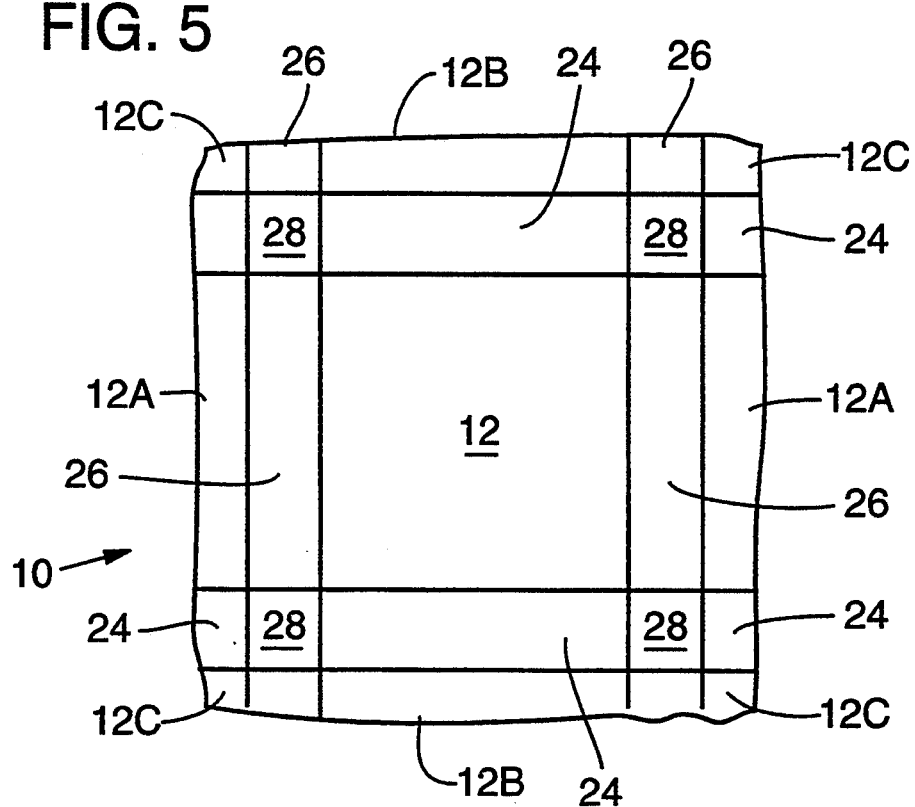
FIG. 5 is a plan view of a portion of a liquid crystal display panel similar to FIG. 4 but incorporating mask elements according to an embodiment of this invention.

According to a preferred embodiment of this invention, mask elements 24, 26 (FIG. 5) are provided overlapping the spaces between pixels 12 and 12B and 12A, respectively to block the transmission of light through the spaces between pixels. The small spaces 28 at the corners of the pixels 12 which are not blocked by mask elements 24, 26 are relatively insignificant.

With mask elements 24, 26 blocking the transmission of light through the spaces between pixels, the overall contrast ratio of the exemplary LCD panel is improved to over 30 to 1, on the order of 3 to 4 times the contrast ratio of such a panel without the mask elements of this invention.

For purposes of simplifying the illustration at FIG. 1 only the central pixel 12 is denoted by stippling and only one each of mask elements 24, 26 are shown by vertical dot-dash lines to be blocking transmission of light through the respective spaces 20, 22 on the opposite substrates. It will be understood, however, that elements 24, 26 provide the light blocking function on all sides of all pixels 12 in the panel as seen in FIG. 2 as if looking through panel 10 from above.

As shown in FIGS. 1, 3, mask elements 24 are applied on one of the substrates 30 in a location directly overlying the spaces 20 between electrodes 36 on the other substrate 32. Correspondingly, mask elements 26 are applied to substrate 32 in locations directly underlying the spaces 22 between electrodes 34 on substrate 30.

Of course the improvement in the contrast ratio of non-emissive flat panel displays will vary with the type, resolution (number and spacing of pixels per unit of area), and all other characteristics of the panel. In all such panels that have spaces between the electrodes, however, application of mask elements in accordance with this invention will achieve substantial increases in the contrast ratio.

The width of mask elements 24, 26 may be made somewhat greater than the width of the inter-electrode spaces 20, 22 in order to compensate for some misalignment between the substrates and to increase the ability of the mask elements to block transmission of light through the inter-electrode spaces. Depending upon the particular dimensions and characteristics of the panel electrodes and material of which the mask elements are composed, the width dimensions of elements 24, 26 may be between about 5 and 50 percent, preferably about 25 percent, greater than the width of the corresponding interpixel spaces. Any additional length of mask elements 24, 26 will be limited in order to prevent electrical shorting between adjacent electrodes.

Mask elements 24, 26 are intended to be as opaque or light blocking as possible and preferably comprise a layer of metallic material of a thickness between 300 and 10,000 angstroms, Å. Chromium or aluminum are suitable materials for mask elements 24, 26 and the former may be provided with a black appearance and light absorbing characteristics by partially oxidizing its surfaces. The actual thickness of elements 24, 26 depends in part upon the manner of application and optical properties of the materials used. Consistent with a desired light transmittance of one percent or less, mask elements 24, 26 should be as thin as possible, 600 Å thick being preferred.

In high information content direct multiplexed panels it is common practice to utilize a divided electrode scheme in order to reduce the multiplex rate. In such schemes, the column electrodes are split into upper and lower portions 52, 54 on substrate 30 (FIG. 6B) at approximately the center of the panel 50 (FIG. 7) and the half-spaces 56 between them are substantially half as wide as the spaces 22 between the column electrodes. Correspondingly, the half-spaces 58 between row electrodes 36 adjacent the centerline on substrate 32 (FIG. 6A) are approximately half as wide as the spaces 20 between the other row electrodes.

Figure 6A:
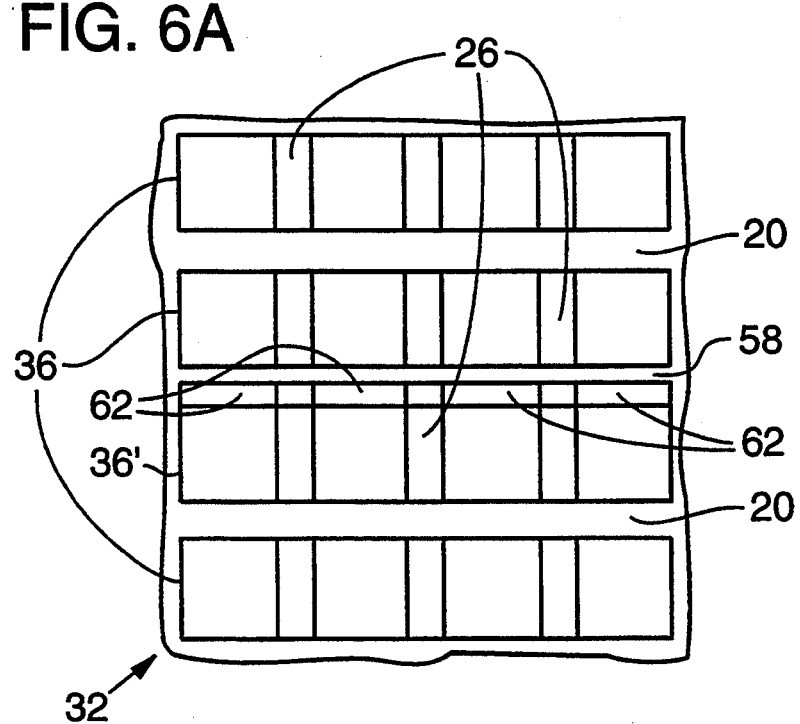
FIGS. 6A and 6B are enlarged, diagrammatic plan views of portions of opposing substrates at the centerline of a divided electrode liquid crystal display panel showing a modified arrangement of electrodes and mask elements near the column split line according to an embodiment of this invention.

Adjacent the lowermost portions of upper column electrodes 52 substrate 30 is provided with mask element parts 60 (FIG. 6B) extending thereacross and substantially as wide as the half-spaces 58 between the center row electrodes (FIG. 6A). In like manner, mask element parts 62 on substrate 32 extend across the upper portions of row electrode 36' just below space 58 (FIG. 6A), and are substantially as long as the width of column electrodes 54, and are substantially the same width as center half-spaces 56 (FIG. 6B).

Figure 6B:
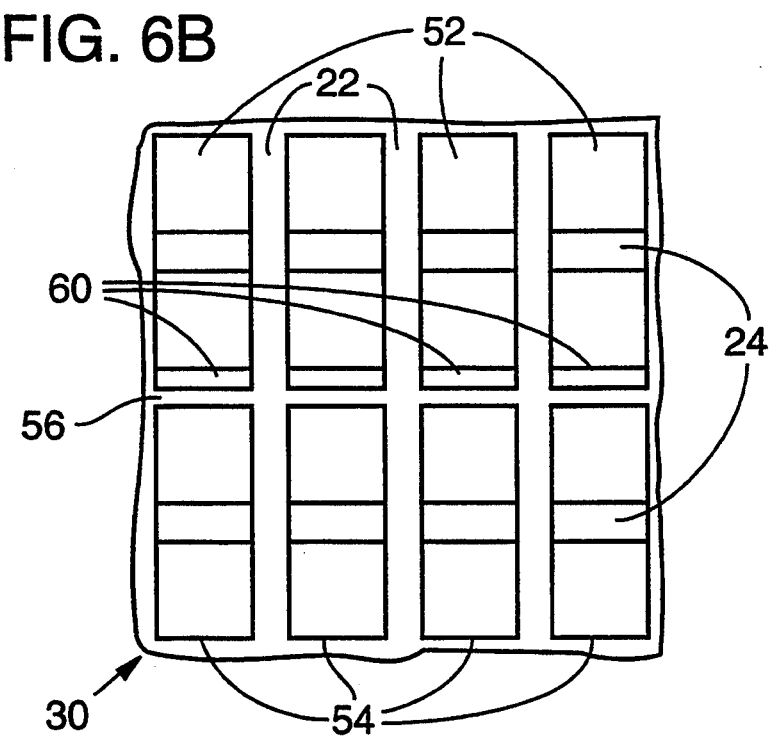

When the substrates 30, 32 of FIGS. 6A and 6B are assembled in opposed relationship and optical alignment (FIG. 7), mask element parts 60 and 62 respectively block transmission of light through half-spaces 58, 56 thereby performing a similar function to mask elements 24, 26 in the embodiment of FIGS. 1-3.

Figure 9:
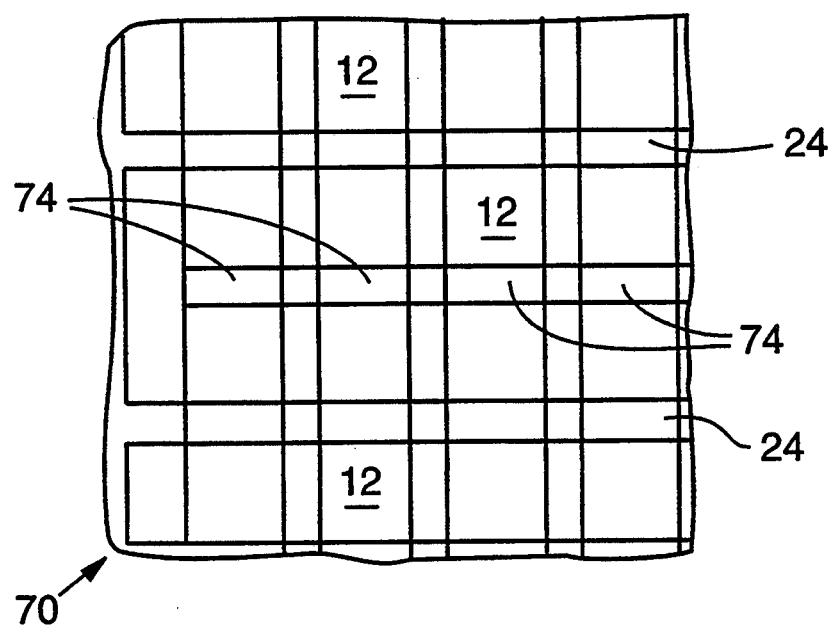
FIG. 9 is a enlarged plan view of the substrates of FIGS. 8A and 8B, assembled together to form a portion of an LCD panel.
Figure 8A:
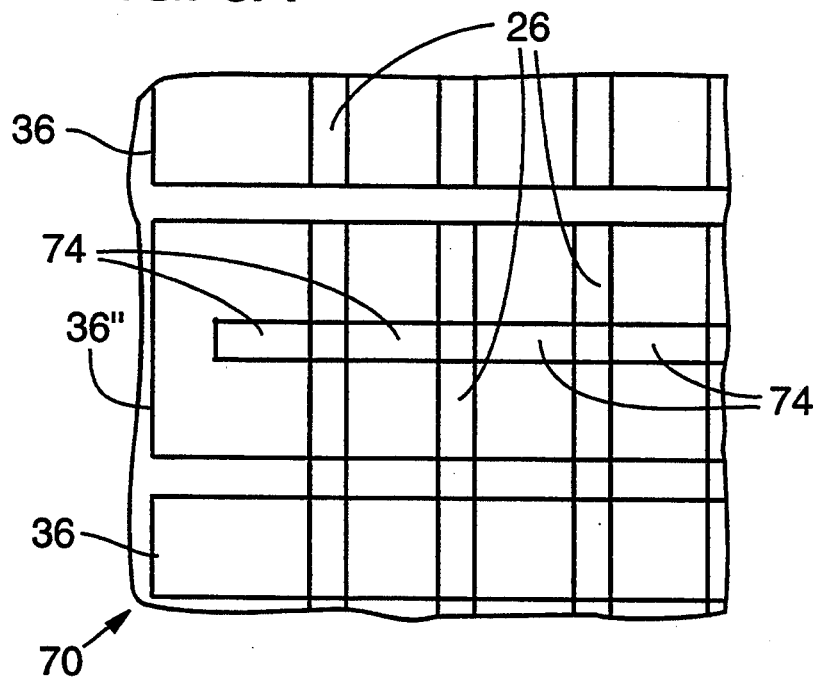
FIG. 8A and 8B are enlarged, diagrammatic plan views of portions of opposing substrates at the centerline of a divided electrode liquid crystal display panel showing an alternative arrangement of electrodes and mask elements on opposing substrates near the column split line according to the present invention.
Figure 8B:
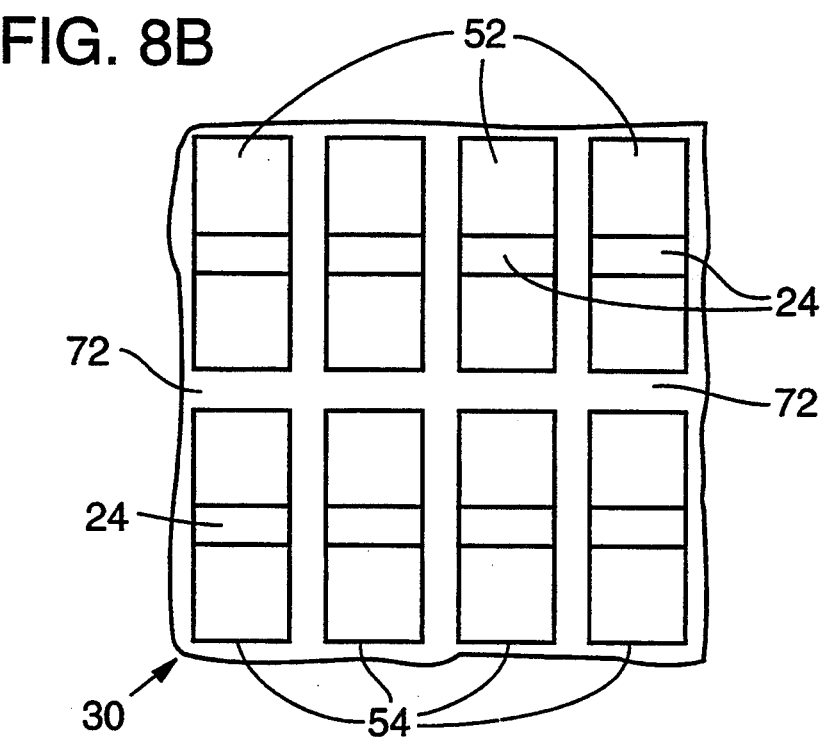

In the divided electrode arrangement illustrated in FIGS. 8A, 8B and 9, substrate 32 is provided at its central portion with a row electrode 36'' that is twice as wide as the other row electrodes 36 with the space between them (FIG. 8A). The column electrodes on substrate 30 are split into upper and lower electrode portions 52, 54, respectively providing spaces 72 between such portions (FIG. 8B).

A plurality of mask elements 74 (FIG. 8A) are provided on substrate 32 along the central portion of row electrode 36'' in locations corresponding to the spaces 72 between upper and lower column electrode portions 52, 54.

When the substrates of FIGS. 8A and 8B are assembled into an LCD panel 70 (FIG. 9) mask elements 74 are essentially in alignment with spaces 72 thereby blocking transmission of light through said spaces.

The method for addressing the electrodes for driving each pixel into its desired optical state with the embodiment of FIG. 9 must be modified because the two panel halves share a common row electrode 36'' and are therefore not completely independent. For example, if LCD 70 is a standard STN display, a row select pulse could start at the double width row 36'' and then be sequentially applied upward to each row 36 in the upper half of the display area and sequentially applied downward for each row 36 in the lower half of the display area such that the upper and lower portions of LCD 70 are refreshed in opposite directions. Alternatively, the two panel halves could be scanned in the same direction but time-shifted by one row so that the double width row electrode 36'' is simultaneously the last row of the upper half to be selected and the first row of the lower half to be selected.

Figure 7:
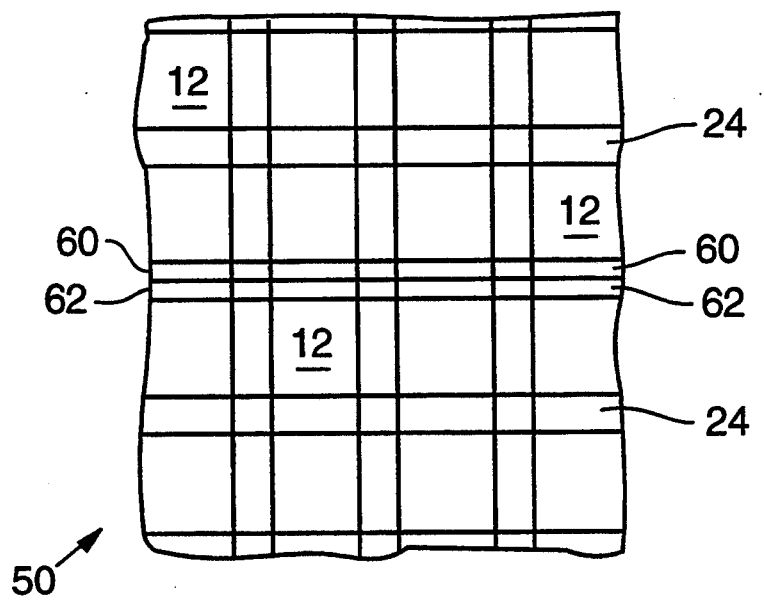
FIG. 7 is a enlarged plan view of the substrates of FIGS. 6A and 6B, assembled together to form a portion of an LCD panel.
Figure 10:
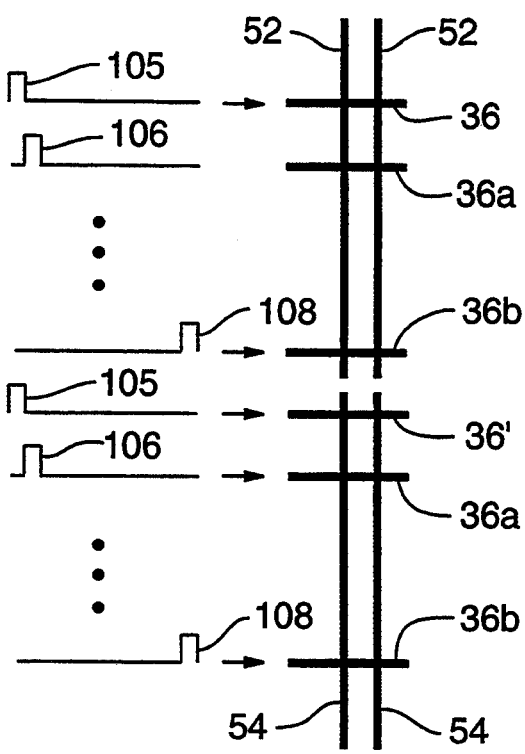
FIG. 10 is a schematic diagram of a row scanning method for addressing the upper and lower panel portions of FIG. 7.

The embodiment shown in FIGS. 6A, 6B and 7 can be addressed as a standard divided electrode panel because the two panel halves are completely independent. An example of this standard addressing scheme is schematically illustrated in FIG. 10 for a multiplexed STN display where the first row select pulse 105 of the frame period is applied to row electrodes 36 and 36'. During this row select pulse, display data voltages corresponding to the selected rows are applied to each of the upper and lower column electrodes 52 and 54. The display data voltage is then updated and the next sequential row select pulse 106 is simultaneously applied to the next row electrodes designated 36a in both the upper and lower display portions of LCD panel 50. Simultaneous row select pulses are sequentially applied to the remaining row electrodes 36 of the upper and lower display portions until the last row electrode 36b overlying upper column electrodes 52 and the lower most row electrode 36b overlying lower column electrodes 54 are addressed with the final row select pulse 108 of the frame period. This process is then repeated for subsequent frame periods. In this manner, the upper and lower portions of LCD 50 are addressed simultaneously.

Figure 11:
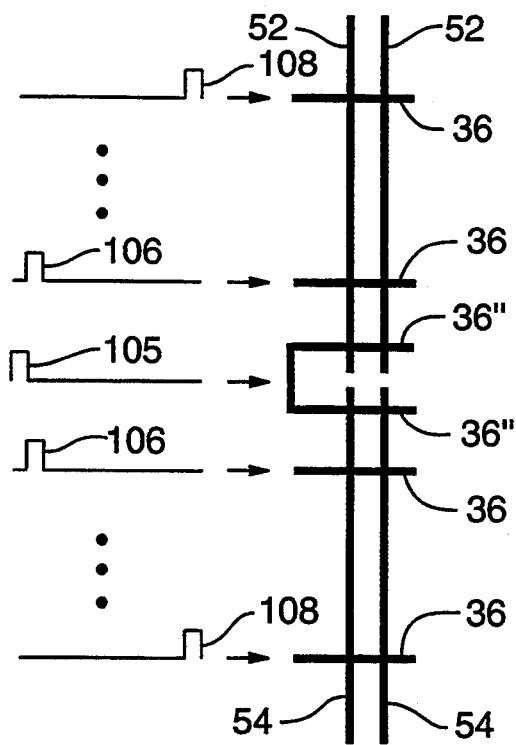
FIG. 11 is a schematic diagram of a row scanning method for addressing the upper and lower panel portions of FIG. 9.
Figure 12:
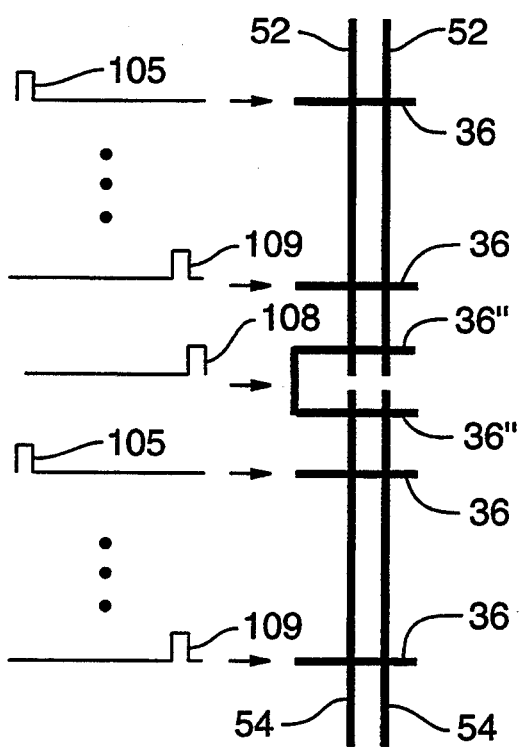
FIG. 12 is a schematic diagram of an alternative scanning method for addressing the upper and lower panel portions of FIG. 9.

Referring now to FIG. 11, the electrode pattern of the embodiment shown in FIG. 9 may be driven with a series of row select pulses 105-108 in the manner described below. Specifically, a first row select pulse 105 is initially applied to the double wide row 36''. Subsequent row select pulses 106 are then simultaneously applied to the adjacent upper and lower row electrodes overlapping upper and lower column electrodes 52 and 54 of the two panel halves. Row select pulses are sequentially applied to successive row pairs in the two panel halves until the final row select pulse 108 of the frame period is simultaneously applied to the upper- and lower-most row electrodes 36 overlying upper and lower column electrodes 52 and 54, respectively. This process is then repeated for subsequent frame periods.

Rather than applying the first row select pulse 105 to row electrode 36'', row select pulse 105 could be applied to the upper-most row electrode 36 overlying the upper column electrodes 52 and the second upper-most row electrode 36 overlying the lower column electrodes 54, respectively. As before, a sequential series of row select pulses are then simultaneously applied to each subsequent row electrode until row select pulse 109 is applied to second lower-most row electrode 36 overlying upper column electrodes 52 and the lower-most row electrode 36 overlying the lower column electrodes 54. The final pulse 108 of the frame period is then applied to the double width row electrodes 36″. This process is repeated for subsequent frame periods.

The mask elements of this invention may be applied either directly to the substrates with the electrodes deposited over the mask elements or with the mask elements formed over the electrodes as illustrated in FIG. 3. Where the so-called "chip-on-glass" technology is used to integrate the electrode driver chips onto the substrate, the mask elements herein described may be most conveniently formed on the substrates at the same time and by the same process as the formation of the leads between the driver chips and the display electrodes.

One common practice of forming the electrodes on the substrates of LCD display panels is to deposit a layer of indium-tin, which in its unoxidized or partially oxidized form is light blocking, and thereafter to fully oxidize the electrode layers to the transparent state, ITO. As an alternative to forming separate mask elements either on the substrates or on the electrodes by common deposition, plating or printing techniques, the mask elements may be formed by selectively oxidizing only the overlapping portions of the indium-tin layers to provide transparent electrodes leaving light blocking or light absorbing portions therebetween as mask elements. Alternatively, the mask elements may be formed by selectively reducing the portions of the fully-oxidized, transparent electrodes that are to serve the light blocking or light absorbing functions.

It should be apparent that the present invention may be embodied in other specific forms without departing from its spirit or essential characteristics. Liquid crystal displays, for example, form only part of the broader category of non-emissive flat panel displays such as dipole suspension displays and electrochromic displays to which this invention could be applied. Although several preferred embodiments of the present invention have been described in detail, it is understood that the present invention is not limited to the embodiments disclosed, but is capable of numerous modifications and substitutions without departing from the spirit of the invention. The described embodiments are to be considered in all respects only as illustrative and not restrictive, The scope of the invention, therefore, is indicated by the appended claims.

What is claimed is:

1. In a non-emissive flat panel display having overlapping patterns of spaced electrodes, one pattern on each of first and second spaced, opposed, substrates at least one of which is transparent and between which electro-optical material is disposed, the electrodes on the first substrate being split at a dividing line into two portions with a space between them overlying a selected electrode on the second substrate, the selected electrode having a width different from that of other electrodes on the second substrate, the electrodes defining a plurality of pixels at their areas of overlap, contrast improvement apparatus, comprising:

a plurality of opaque first mask elements on the first substrate overlying spaces between the electrodes on the second substrate;

a plurality of opaque second mask elements on the second substrate overlying spaces between the electrodes on the first substrate; and a plurality of opaque third mask elements overlying the dividing line and being positioned on the selected electrode on the second substrate, the first and third mask elements being similar to each other so that the display appears uniform across the dividing line.

2. The display of claim 1 in which the selected electrode is wider than other electrodes on the second substrate.

3. The display of claim 1 in which the selected electrode is twice as wide as other electrodes on the second substrate.

4. The display of claim 1 in which the space between the two portions of electrodes on the first substrate overlies a middle portion of the selected electrode and the third mask elements are positioned on the middle portion.

5. The display of claim 1 in which the width of each of the first and second mask elements is between 5 and 50 percent greater than the spaces between electrodes on the respective second and first substrates.

6. In a non-emissive flat panel display having overlapping patterns of spaced electrodes, one pattern on each of first and second spaced, opposed, substrates at least one of which is transparent and between which electro-optical material is disposed, the electrodes on the first substrate being split at a dividing line into two spaced-apart portions, the electrodes defining a plurality of pixels at their areas of overlap, contrast improvement apparatus, comprising:

a plurality of opaque first mask elements on the first substrate overlying spaces between the electrodes on the second substrate;

a plurality of opaque second mask elements on the second substrate overlying spaces between the electrodes on the first substrate; and a plurality of opaque third mask element pairs overlying the dividing line and having dimensions similar to those of the first mask elements so that the display appears uniform across the dividing line, one of each pair of third mask elements being positioned on each of the first and second substrates.

7. The display of claim 6 in which the two portions of electrodes on the first substrate are separated by a distance different from that of the spaces between the electrodes on the second substrate.

8. The display of claim 7 in which the distance between the two portions of electrodes on the first substrate is less than that of the spaces between the electrodes on the second substrate.

9. The display of claim 6 in which the width of each of the first and second mask elements is between 5 and 50 percent greater than the spaces between electrodes on the respective second and first substrates.

10. In a non-emissive flat panel display having overlapping patterns of spaced electrodes, one pattern on each of first and second spaced, opposed, substrates at least one of which is transparent and between which electro-optical material is disposed, the electrodes defining a plurality of pixels at their areas of overlap, and a plurality of first and second mask elements on the first and second substrates forming opaque areas overlying spaces between the electrodes on the second and first substrates, respectively, the improvement comprising:

the electrodes on the first substrate having a discontinuity at a dividing line that extends across the display, the discontinuity dividing the electrodes into two portions with a space between them overlying a selected electrode on the second substrate, the selected electrode having a width greater than that of other electrodes on the second substrate; and a plurality of opaque third mask elements overlying the discontinuity to form opaque areas with dimensions similar to those of the first mask elements so that the display appears uniform across the discontinuity.

* * * * *